United States Patent
Koppeser et al.

(10) Patent No.: US 11,333,223 B2
(45) Date of Patent: May 17, 2022

(54) ORBITAL TENSIONER

(71) Applicant: GATES CORPORATION, Denver, CO (US)

(72) Inventors: Michael Koppeser, Windsor (CA);
Marc Cadarette, London (CA);
Sangkyu Kim, Milton (CA)

(73) Assignee: Gates Corporation, Denver, CO (US)

( * ) Notice: Subject to any disclaimer, the term of this patent is extended or adjusted under 35 U.S.C. 154(b) by 249 days.

(21) Appl. No.: 16/533,486

(22) Filed: Aug. 6, 2019

(65) Prior Publication Data
US 2021/0041010 A1 Feb. 11, 2021

(51) Int. Cl.
*F16H 7/08* (2006.01)
*F16H 7/12* (2006.01)

(52) U.S. Cl.
CPC .............. *F16H 7/08* (2013.01); *F16H 7/0829* (2013.01); *F16H 7/1245* (2013.01); *F16H 2007/081* (2013.01); *F16H 2007/0863* (2013.01); *F16H 2007/0865* (2013.01); *F16H 2007/0874* (2013.01); *F16H 2007/0878* (2013.01); *F16H 2007/0893* (2013.01)

(58) Field of Classification Search
CPC ................. F16H 7/08; F16H 2007/081; F16H 2007/0863; F16H 2007/0865; F16H 2007/0874; F16H 2007/0878; F16H 2007/0893; F16H 7/0829; F16H 7/0831; F16H 7/0838; F16H 7/10; F16H 7/1218; F16H 7/1245
See application file for complete search history.

(56) References Cited

U.S. PATENT DOCUMENTS

| | | | |
|---|---|---|---|
| 315,735 A | 4/1885 | Colburn |
| 611,160 A | 9/1898 | Whipple |
| 976,115 A | 11/1910 | Bard |
| 1,433,958 A | 10/1922 | Laughton |
| 1,805,326 A | 5/1931 | Bunker et al. |

(Continued)

FOREIGN PATENT DOCUMENTS

| | | |
|---|---|---|
| CN | 105240471 A | 1/2016 |
| CN | 105864378 A | 8/2016 |

(Continued)

OTHER PUBLICATIONS

Taiwan, The Intellectual Property Office Letter of Examination Report; Application No. 109126607, dated Jun. 11, 2021.

*Primary Examiner* — Michael R Mansen
*Assistant Examiner* — Raveen J Dias
(74) *Attorney, Agent, or Firm* — Alyssa K. Sandrowitz, Esq.

(57) ABSTRACT

An orbital tensioner comprising an annular base, a ring journalled to the annular base on a ball bearing, said ring having a ring axis of rotation (A-A), a first pulley journalled to the ring, a first pulley axis of rotation (B-B) offset from the ring axis of rotation (A-A), a pivot arm pivotally mounted to the ring, a pivot arm pivot axis (C-C) offset from the ring axis of rotation (A-A), a second pulley journalled to the pivot arm, a torsion spring biasing the pivot arm in a first direction, the ball bearing having a first race and a second race, the ring fixed to the first race, the annular base fixed to the second race, and a damping mechanism frictionally disposed between the ring and the base.

14 Claims, 5 Drawing Sheets

(56) References Cited

U.S. PATENT DOCUMENTS

| | | | |
|---|---|---|---|
| 2,954,726 A | 10/1960 | Kerridge | |
| 4,319,303 A | 3/1982 | Thorn | |
| 4,564,098 A | 1/1986 | Hormann | |
| 4,758,208 A | 7/1988 | Banos et al. | |
| 4,824,421 A | 4/1989 | Komorowski | |
| 4,981,116 A * | 1/1991 | Trinquard | F02B 67/06 123/90.31 |
| 5,076,920 A | 12/1991 | Danowski et al. | |
| 5,083,983 A * | 1/1992 | Hirai | F16H 7/1218 474/135 |
| 5,164,084 A | 11/1992 | Danowski et al. | |
| 5,221,236 A | 6/1993 | Raymer et al. | |
| 5,234,384 A * | 8/1993 | Shibata | F16H 7/1218 474/135 |
| 5,503,599 A * | 4/1996 | Brehler | F16H 7/1218 474/112 |
| 5,725,450 A | 3/1998 | Huskey | |
| 5,776,025 A | 7/1998 | Labudde et al. | |
| 6,117,034 A | 9/2000 | Vine | |
| 6,511,393 B1 | 1/2003 | Bogl et al. | |
| 6,609,989 B2 | 8/2003 | Bogner et al. | |
| 6,648,783 B1 * | 11/2003 | Bogner | F16H 7/1281 474/134 |
| 6,685,854 B2 | 2/2004 | Memmer | |
| 6,689,001 B2 | 2/2004 | Oliver et al. | |
| 6,736,743 B2 | 5/2004 | Fletcher et al. | |
| 6,830,524 B2 | 12/2004 | Tamai | |
| 6,857,978 B2 | 2/2005 | Polster et al. | |
| 6,960,145 B2 | 11/2005 | Fraley, Jr. et al. | |
| 7,285,065 B2 | 10/2007 | Dinca et al. | |
| 7,468,013 B2 | 12/2008 | Di Giacomo et al. | |
| 7,494,434 B2 | 2/2009 | McVicar et al. | |
| 7,530,911 B2 | 5/2009 | Serkh | |
| 7,892,125 B2 | 2/2011 | Nelson et al. | |
| 7,901,310 B2 | 3/2011 | Lolli et al. | |
| 8,092,328 B2 | 1/2012 | Dec et al. | |
| 8,353,795 B2 | 1/2013 | Montani et al. | |
| 8,439,780 B2 | 5/2013 | Ruffini et al. | |
| 8,821,323 B2 | 9/2014 | Jud et al. | |
| 8,821,382 B2 | 9/2014 | Kagawa | |
| 9,341,234 B2 | 5/2016 | Shiriike | |
| 9,625,013 B2 | 4/2017 | Wolf et al. | |
| 9,709,137 B2 | 7/2017 | Walter | |
| 9,890,837 B1 * | 2/2018 | Martinez | F16H 7/0831 |
| 10,309,497 B2 * | 6/2019 | Walter | B60K 25/00 |
| 10,520,066 B2 * | 12/2019 | Walter | F16H 7/1218 |
| 10,876,606 B2 * | 12/2020 | Singh | F16H 7/0831 |
| 2002/0010045 A1 | 1/2002 | Serkh | |
| 2002/0039943 A1 | 4/2002 | Serkh | |
| 2002/0086751 A1 | 7/2002 | Bogner et al. | |
| 2003/0109342 A1 | 6/2003 | Oliver et al. | |
| 2003/0153420 A1 | 8/2003 | Rogers | |
| 2003/0153421 A1 | 8/2003 | Liu | |
| 2003/0176249 A1 | 9/2003 | Polster | |
| 2003/0216203 A1 | 11/2003 | Oliver et al. | |
| 2003/0220164 A1 | 11/2003 | Tamai | |
| 2004/0002401 A1 | 1/2004 | Iverson | |
| 2004/0043854 A1 | 3/2004 | Fraley, Jr. et al. | |
| 2004/0072642 A1 | 4/2004 | Serkh | |
| 2004/0077446 A1 | 4/2004 | Manning | |
| 2004/0087401 A1 | 5/2004 | Serkh | |
| 2004/0174651 A1 | 9/2004 | Aisenbrey | |
| 2005/0059518 A1 * | 3/2005 | Joslyn | F16H 7/1218 474/135 |
| 2005/0096168 A1 | 5/2005 | Serkh et al. | |
| 2005/0181901 A1 | 8/2005 | Shin et al. | |
| 2006/0100051 A1 | 5/2006 | Di Giacomo et al. | |
| 2006/0217222 A1 * | 9/2006 | Lolli | F02B 67/06 474/134 |
| 2006/0287146 A1 | 12/2006 | McVicar et al. | |
| 2007/0037648 A1 | 2/2007 | Di Giacomo et al. | |
| 2008/0153644 A1 * | 6/2008 | Arneth | F16H 7/1281 474/135 |
| 2008/0214342 A1 | 9/2008 | Montani et al. | |
| 2008/0220919 A1 | 9/2008 | Antchak et al. | |
| 2008/0248230 A1 | 10/2008 | Dewitte et al. | |
| 2010/0144473 A1 | 6/2010 | Ward et al. | |
| 2012/0318589 A1 | 12/2012 | Staley et al. | |
| 2013/0040770 A1 | 2/2013 | Wolf et al. | |
| 2013/0079185 A1 * | 3/2013 | Schauerte | F16H 7/1281 474/135 |
| 2013/0095967 A1 * | 4/2013 | Wolf | F16H 7/1281 474/135 |
| 2013/0203535 A1 | 8/2013 | Mack et al. | |
| 2013/0260932 A1 * | 10/2013 | Adam | F16H 7/1218 474/134 |
| 2014/0315673 A1 * | 10/2014 | Zacker | F16H 7/1218 474/135 |
| 2014/0342862 A1 | 11/2014 | Wolf et al. | |
| 2015/0051033 A1 * | 2/2015 | Replete | F16H 7/1209 474/117 |
| 2015/0308545 A1 * | 10/2015 | Harvey | F02B 67/06 474/117 |
| 2015/0345597 A1 * | 12/2015 | Walter | F02B 67/06 474/134 |
| 2017/0002902 A1 * | 1/2017 | Cariccia | F16H 7/0829 |
| 2017/0146100 A1 * | 5/2017 | Walter | F02B 67/06 |
| 2018/0010670 A1 * | 1/2018 | Leucht | F16H 7/0831 |
| 2019/0017579 A1 * | 1/2019 | Stadermann | F16H 7/1218 |
| 2019/0078667 A1 | 3/2019 | Liu et al. | |
| 2019/0145501 A1 * | 5/2019 | Singh | F16H 7/1218 474/134 |
| 2019/0285147 A1 * | 9/2019 | Singh | F16H 7/1218 |

FOREIGN PATENT DOCUMENTS

| | | |
|---|---|---|
| CN | 105179619 B | 7/2017 |
| CN | 107975573 A | 5/2018 |
| CN | 108397530 A | 8/2018 |
| DE | 508156 C | 9/1930 |
| DE | 19631507 A1 | 2/1998 |
| DE | 10044645 A1 | 3/2002 |
| DE | 102011085122 A1 | 4/2013 |
| DE | 102013213127 A1 | 1/2015 |
| DE | 102015211227 A1 | 12/2016 |
| EP | 2128489 B1 | 8/2011 |
| EP | 2385272 A1 | 11/2011 |
| JP | 3028551 A | 2/1991 |
| JP | 660969 A | 3/1994 |
| WO | 2009011796 A1 | 1/2009 |
| WO | 2014100894 A1 | 7/2014 |

* cited by examiner

ORBITAL TENSIONER

FIELD OF THE INVENTION

The invention relates to an orbital tensioner, and more particularly, to an orbital tensioner having a ball bearing having a first race and a second race, a ring mounted to the ball bearing first race, and an annular base mounted to the ball bearing second race.

BACKGROUND OF THE INVENTION

A multi-ribbed belt is commonly used on automotive vehicles to transmit power between the engine crankshaft and accessory components. On a conventional drive, engine crankshaft pulley drives accessories via one belt or multi belts. A tensioner is usually used when multi accessories are driven via a belt. Even when the tensioner arm is positioned properly, belt installation tension can change slightly with respect to length tolerance of the belt.

Motor-generator units (MGU) are used to implement BSG (belt starter-generator) IC engine start-stop, torque assist to boost engine acceleration and recuperation to generate electricity in addition to normal electrical generation by an alternator during IC engine operation. Significant fuel savings and reduction of exhaust can be achieved by using BSG technology.

To control tension in two different driving modes, namely, MGU driving and MGU generating with engine driving, an orbital style tensioner was developed. The tensioner typically has a rotary ring and a pivot arm connected by one spring to the rotary ring. The tensioner is mounted to the MGU. This form of tensioner can control belt operating tension in both modes: motoring and generating. However, unlike a conventional single arm tensioner, it is not practical to position the orbital tensioner pulleys in an optimized way to reduce tension variation. Installation tension changes, due to belt length tolerances and pulley position and size, can be significantly higher than for a single arm tensioner. Belt tension is an important factor determining friction loss or power loss of a belt drive and so it is desirable to lower belt tension without sacrificing system functional performance.

The prior art utilizes plastic bushings between the base and rotary ring to facilitate movement.

Representative of the art is US20190078667 which discloses a tensioner comprising a base defining a hole, the hole having a center C, the hole having a diameter sufficient to receive a driven pulley, a rotary arm engaged with the base by a retaining member connected to the base, the rotary arm rotatable about the center C, a pivot arm mounted to the rotary arm on a pivot, the pivot offset from center C, a first pulley journalled to the rotary arm, a second pulley journalled to the pivot arm, a torsion spring engaged between the rotary arm and the pivot arm for biasing the second pulley toward the first pulley, a damping member frictionally engaged between the base and the rotary arm, and the rotary arm defining a portion for receiving a first pulley fastener whereby a first pulley position is adjustable.

What is needed is an orbital tensioner having a ball bearing having a first race and a second race, a ring mounted to the ball bearing first race, and an annular base mounted to the ball bearing second race. The present invention meets this need.

SUMMARY OF THE INVENTION

The primary aspect of the invention is to provide an orbital tensioner having a ball bearing having a first race and a second race, a ring mounted to the ball bearing first race, and an annular base mounted to the ball bearing second race.

Other aspects of the invention will be pointed out or made obvious by the following description of the invention and the accompanying drawings.

The invention is an orbital tensioner comprising an annular base, a ring journalled to the annular base on a ball bearing, said ring having a ring axis of rotation (A-A), a first pulley journalled to the ring, a first pulley axis of rotation (B-B) offset from the ring axis of rotation (A-A), a pivot arm pivotally mounted to the ring, a pivot arm pivot axis (C-C) offset from the ring axis of rotation (A-A), a second pulley journalled to the pivot arm, a torsion spring biasing the pivot arm in a first direction, the ball bearing having a first race and a second race, the ring fixed to the first race, the annular base fixed to the second race, and a damping mechanism frictionally disposed between the ring and the base.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
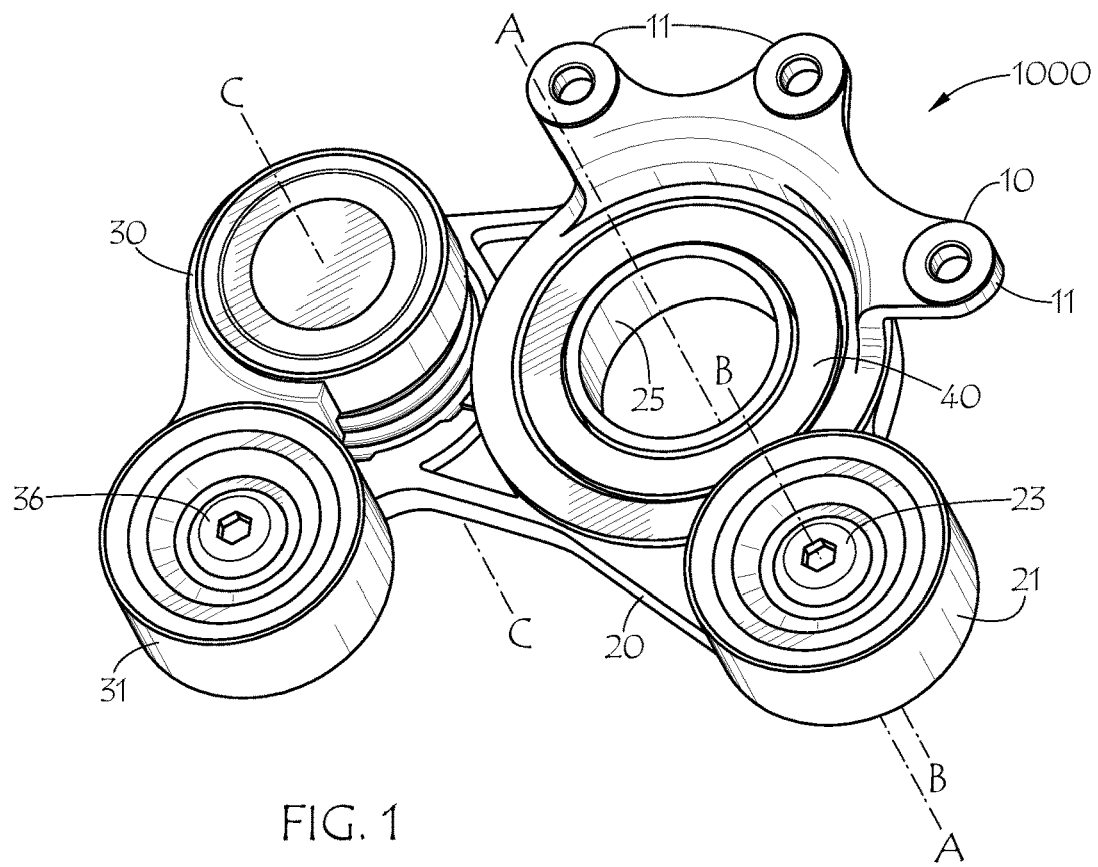
FIG. 1 is a back perspective view of the tensioner.

FIG. 1 is a back perspective view of the tensioner. Tensioner 1000 comprises a base 10, ring 20 and pivot arm 30. Ball bearing 40 is disposed between base 10 and ring 20. Base 10 and ring 20 are journalled together on bell bearing 40.

Pulley 21 is journalled to ring 20 on bearing 22. Pulley 31 is journalled to pivot arm 30 on bearing 34. The axis of rotation B-B of pulley 21 is offset from the axis of rotation A-A of bearing 40, and thereby of ring 20. Pivot arm 30 pivots about pivot axis C-C. Ring 20 rotationally translates with respect to base 10 about axis A-A. In operation ring 20 oscillates between different positions about axis A-A depending on belt tension variations and the MGU system operating conditions.

The belt is trained in an accessory drive system. The belt engages pulley 21 and pulley 31. The accessory drive system may comprise certain engine driven accessories including water pump, fuel injection pump, air conditioning compressor, oil pump, power steering pump to name a few, see FIG. 6.

Base 10 has an annular or torus-like form and comprises mounting bracket with holes 11. Mounting bracket is used to attach the tensioner to a motor generator unit (MGU) using fasteners such as bolts. Axis A-A aligns with an axis of rotation of an MGU shaft MGUS, see FIG. 6. The base annular form aligns with axis A-A.

In the disclosed embodiment bearing 40 comprises a 30BD40 double row angular contact bearing available from Bauhaun, Taide, NSK, Nachi or SKF for example. Others offer suitable double row bearings as well. An example size for the embodiment described herein is 30 mm ID×55 mm OD×23 mm wide. A sealed deep groove single row bearing may also be used according to the needs of a user. An example size single row bearing is 30 mm ID×55 mm OD×13 mm wide. Either style of bearing is preferably sealed to retain a lubricant and resist contamination. The lubricant can comprise either grease or oil known in the art.

Bearing 40 is press fit into base 10 and ring 20. Bearing 40 inner race 41 is staked to ring 20. Bearing 40 outer race 42 is staked to cylindrical portion 12 of base 10. Staking is generally known as means to fix two components together, for example, see among others: https://www.assemblymag.com/articles/87755-assembly-presses-crimping-staking-swaging-clinching.

Use of ball bearing 40 improves long term operational alignment of ring 20 with base 10. Pulleys 21, 31 are displaced outward from the plane of base 10, so when a belt tensile load is applied a couple is produced. The couple acts to rotate ring 20 with respect to base 10. Prior art orbital tensioners utilize plastic bushings to resist the couple and maintain coplanar alignment of the base and ring. However, plastic bushings deteriorate with time leading to gradual misalignment of the ring and base and thereby misalignment of the pulleys with the belt plane. This in turn causes undesirable noise and premature wear of the belt. The belt can ultimately disengage from the pulleys if the misalignment is allowed to continue unabated. Undue noise can become a factor as well. On the other hand, the ball bearing is more durable and lasts longer and holds alignment between the ring and base more accurately over time compared to plastic bushings. A double row bearing is preferable to a single row bearing since it is more resistant to "rock" compared to a single row bearing. However, depending on the system design either may be selected. Needle bearings may be used as well with equal success.

Figure 2:
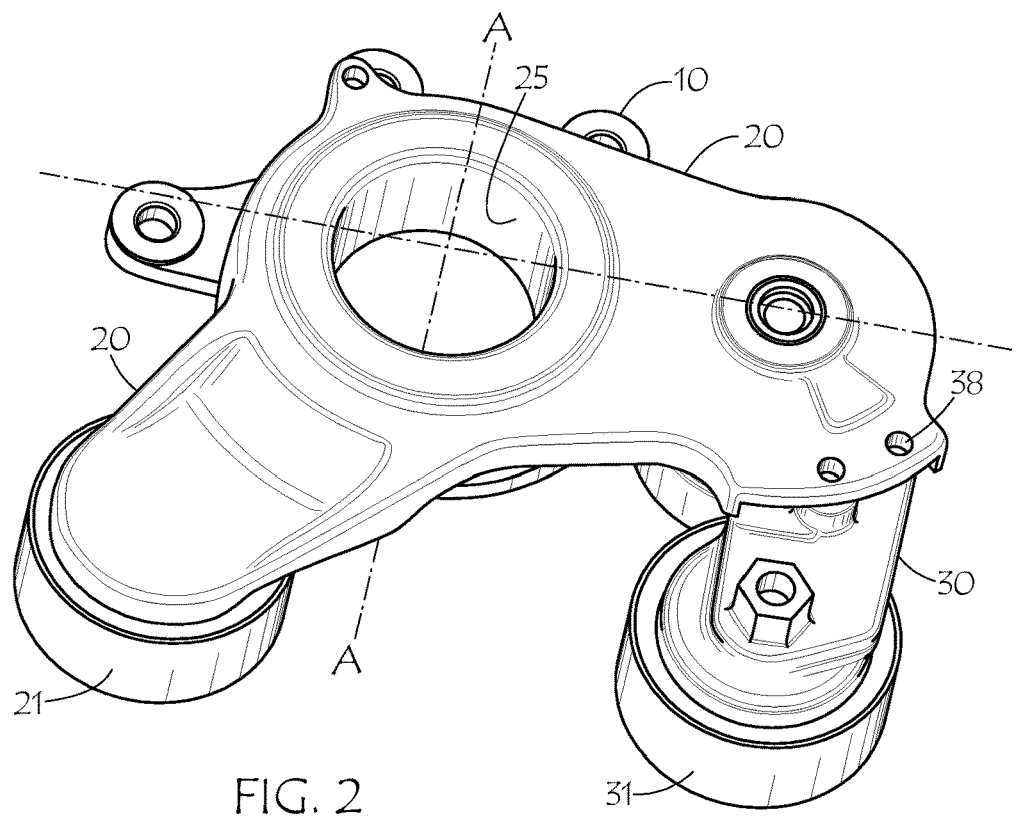
FIG. 2 is a front perspective view of the tensioner.

FIG. 2 is a front perspective view of the tensioner. Bearing 40 inner race 41 is press fit onto cylindrical portion 25 of ring 20. Race 41 is staked to portion 25. Portion 25 may comprise a hollow cylinder or solid shaft. Pin 37 engages a hole 38 in ring 20 during installation. Pin 37 holds pivot arm 30 in a predetermined position.

Figure 3:
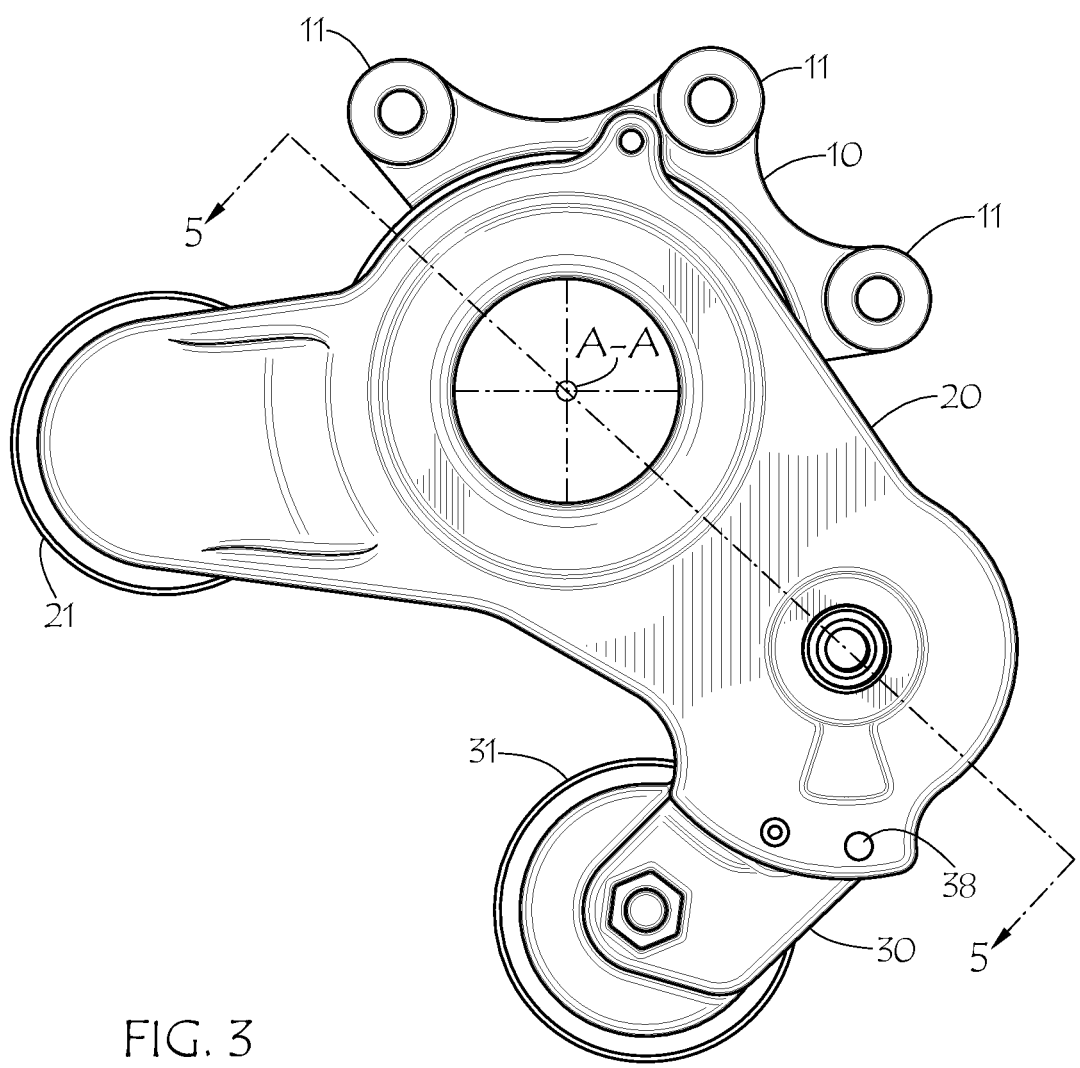
FIG. 3 is a front plan view of the tensioner.

FIG. 3 is a front plan view of the tensioner. In this embodiment pulleys 21, 31 are on the same side of the tensioner, typically facing an MGU. This can be referred to as an inverted design.

Figure 4:
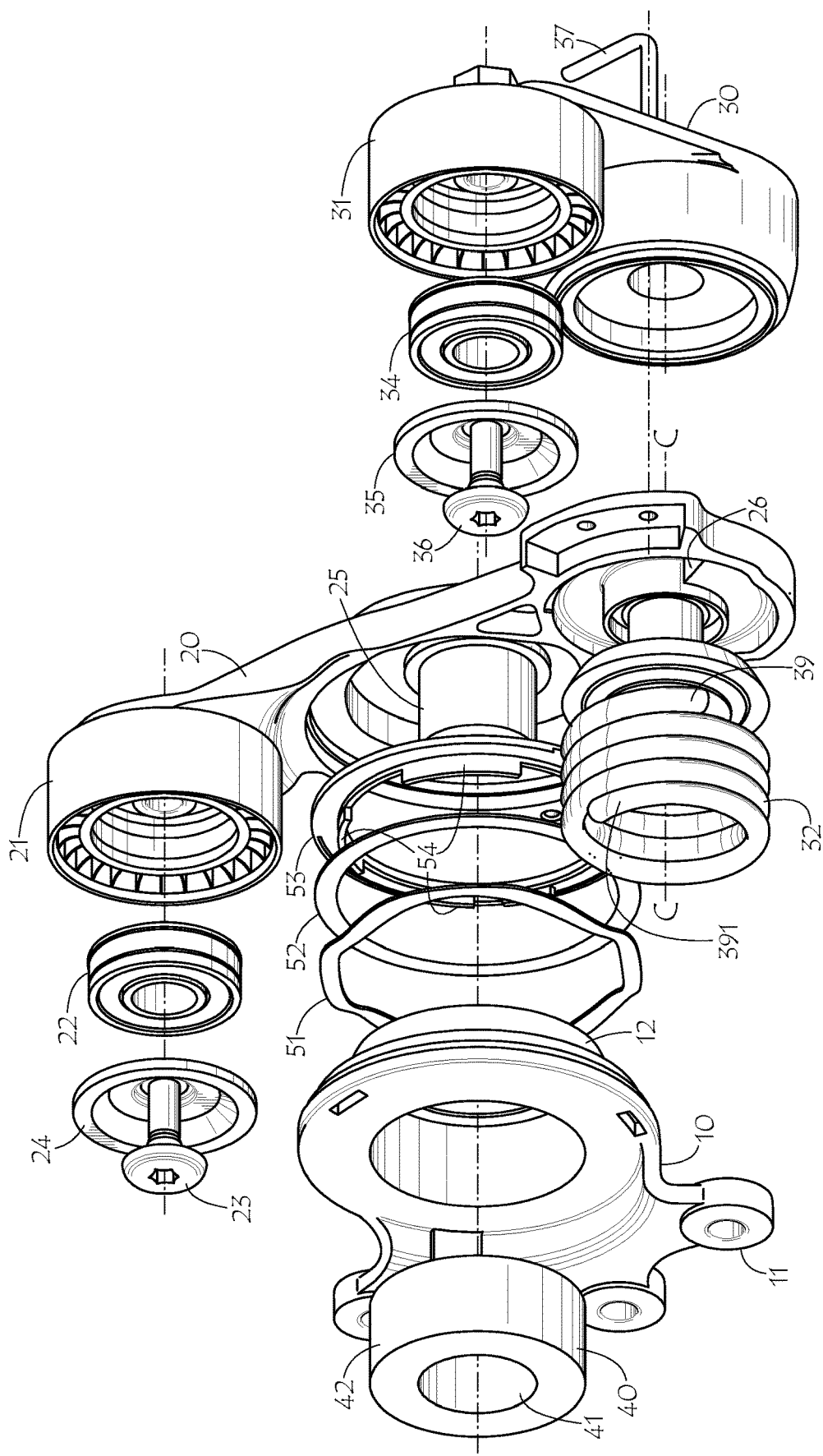
FIG. 4 is an exploded view.

FIG. 4 is an exploded view. The damping mechanism comprises elements 51, 52, 53. Friction element 53 engages ring 20. Wave spring 51 presses on steel ring 52. Ring 52 protects element 53 by distributing the normal force from wave spring 51 to friction element 53. Friction element 53 is locked to base 10 by tabs 54 so as to prevent a relative rotation of element 53. Friction element 53 damps movement of ring 20.

Pulley 21 is journalled on bearing 22. Dust shield 24 prevents debris from entering bearing 22. Bolt 23 retains the dust shield 24 and bearing 22, and thereby pulley 21 on ring 20.

Pulley 31 is journalled on bearing 34. Dust shield 35 keeps debris from entering bearing 34. Bolt 36 retains the dust shield 35 and bearing 34, and thereby pulley 31 on pivot arm 30.

Pin 37 temporarily engages between pivot arm 30 and base 10. Removable pin 37 locks pivot arm 30 in a predetermined installation position. Pin 37 is removed by an installer after the tensioner is installed in its final position on an MGU, thereby releasing the pivot arm 30 and pulley 31 to apply a load to a belt.

End 39 of spring 32 bears upon stop 26. Spring 32 is loaded in an unwinding direction. End 391 bears upon a stop 392 in pivot arm 30.

Figure 5:
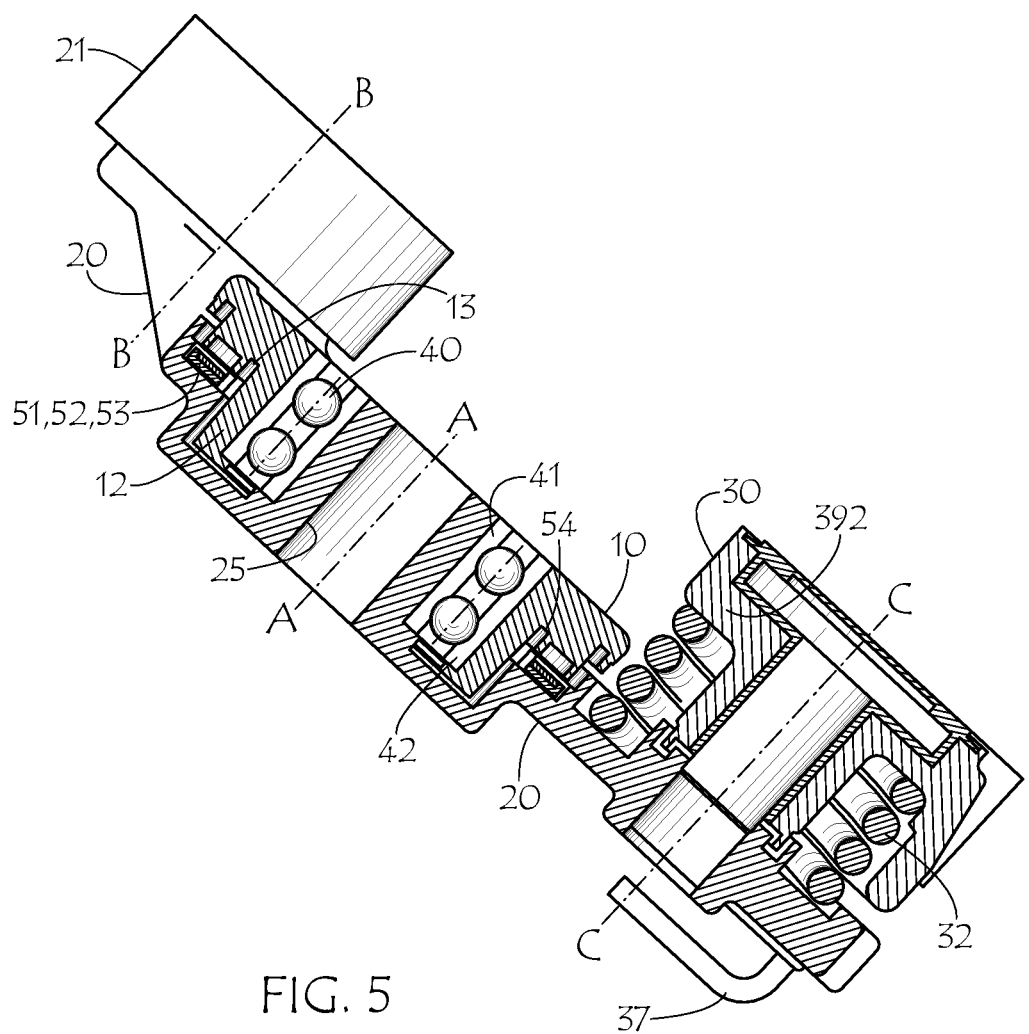
FIG. 5 is a cross section 5-5 in FIG. 3.

FIG. 5 is a cross section 5-5 in FIG. 3. Double row bearing 40 is shown. Inner race 41 is press fit onto cylindrical portion 25. Outer race 42 is press fit into cylindrical portion 12. Use of a bearing negates the need for a prior art connection wherein the ring clamps the base or the base clamps the ring. Instead, the inventive tensioner links the ring and base entirely though the bearing without need of a clamp or overlap style joint.

Bearing 40 provides more accurate movement of the ring on the base with less movement resistance when compared to a plastic bushing.

Damping mechanism 51, 52, 53 is engaged between the base 10 and ring 20 to damp ring movement. Tabs 54 engage respectively portions 13 in base 10 to prevent movement of friction element 53 relative to base 10. In this way the frictionally damped movement is between friction element 53 and ring 20. In an alternate embodiment friction element 53 is locked to ring 20 with relative frictional movement occurring between friction element 53 and base 10 with equal effect.

Figure 6:
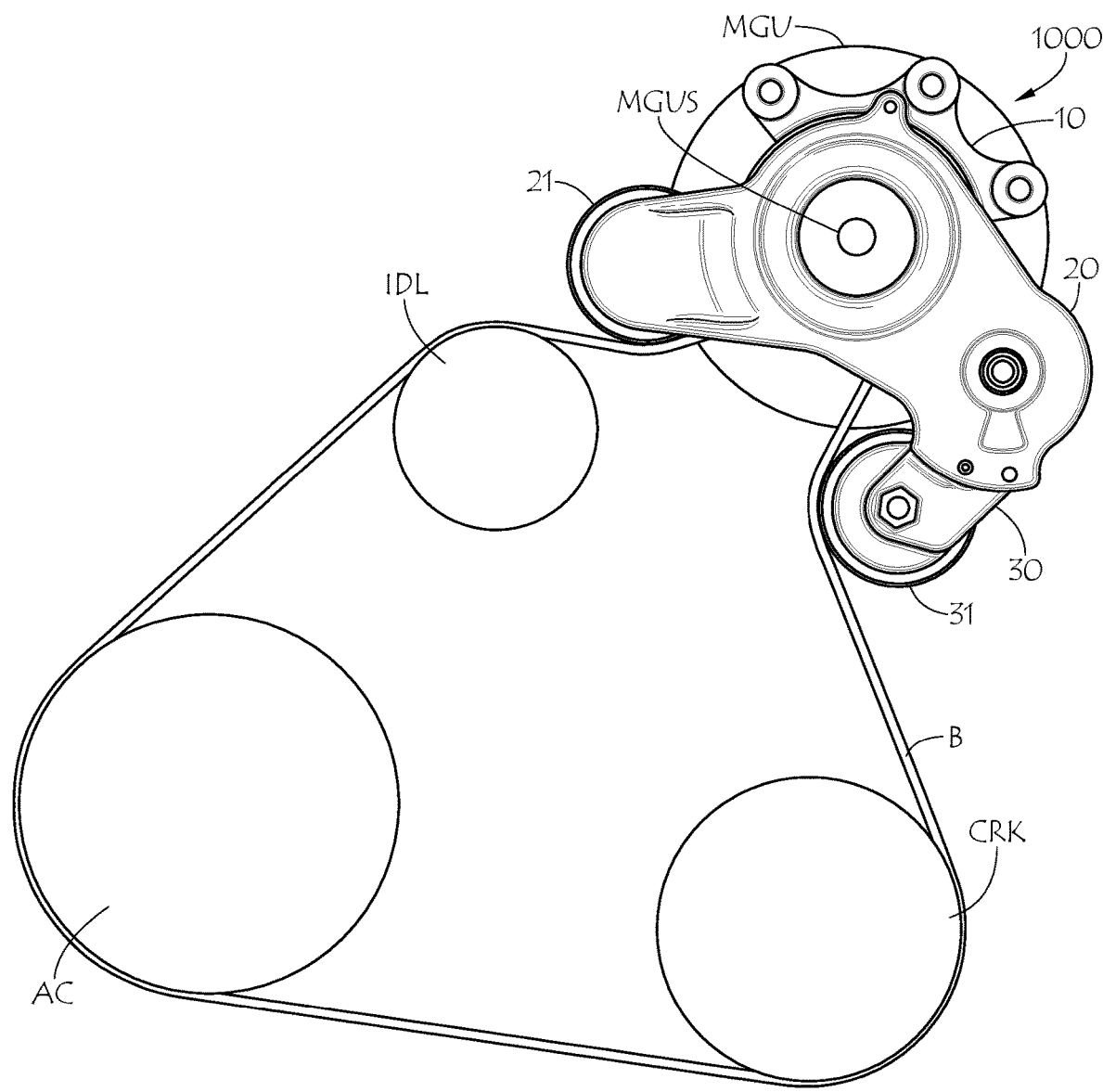
FIG. 6 is an MGU system with the inventive tensioner.

FIG. 6 is an MGU system with the inventive tensioner. Tensioner 1000 is mounted to an MGU which is part of an accessory drive system. Belt B is trained between the pulley on an engine crankshaft CRK, air conditioner compressor AC and the MGU with an MGU shaft MGUS. An idler pulley IDL provides for proper routing of the belt on the engine. Pivot arm 30 presses pulley 31 against the belt in order to impart a belt tensile load. The belt load prevents the belt from slipping on the system pulleys, which can cause noise and premature wear of the belt.

For stop/start operation, the MGU generates electrical power when the engine is operating. The MGU is driven by the engine in this mode. When the engine is stopped the MGU becomes the driver and provides starting power for the engine. The MGU keeps the air conditioning compressor operating by use of an electric clutch (not shown). The electric clutch is mounted to the air conditioning compressor and is controlled by a vehicle ECU. The crankshaft CRK may also comprise a one-way clutch (not shown) to facilitate operation.

An orbital tensioner comprising an annular base, a ring rotationally engaged with the annular base with a ball bearing, the ring having a ring axis of rotation A-A, a first pulley journalled to the ring and having a first pulley axis of rotation B-B that is offset from the ring axis of rotation A-A, a pivot arm pivotally mounted to the ring, the pivot arm pivot axis C-C is offset from the ring axis of rotation A-A, a second pulley journalled to the pivot arm, a torsion spring biasing the pivot arm in a first direction, the ball bearing having a first race and a second race, the ring staked to the first race, the annular base staked to the second race, and a damping mechanism frictionally disposed between the ring and the base.

An orbital tensioner comprising an annular base, a ring journalled to the annular base on a ball bearing, said ring having a ring axis of rotation A-A, a first pulley journalled to the ring, a first pulley axis of rotation B-B offset from the ring axis of rotation A-A, a pivot arm pivotally mounted to the ring, a pivot arm pivot axis C-C offset from the ring axis of rotation A-A, a second pulley journalled to the pivot arm, a torsion spring biasing the pivot arm in a first direction, the ball bearing having a first race and a second race, the ring fixed to the first race, the annular base fixed to the second race, and a damping mechanism frictionally disposed between the ring and the base.

An orbital tensioner comprising a base, a ring and the base journalled together on a ball bearing, said ring having a ring axis of rotation A-A, a first pulley journalled to the ring, a first pulley axis of rotation B-B offset from the ring axis of rotation A-A, a pivot arm pivotally mounted to the ring, a pivot arm pivot axis C-C is offset from the ring axis of rotation A-A, a second pulley journalled to the pivot arm, a torsion spring biasing the pivot arm in a first direction, and a damping mechanism frictionally disposed between the ring and the base.

Although a form of the invention has been described herein, it will be obvious to those skilled in the art that variations may be made in the construction and relation of parts without departing from the spirit and scope of the invention described herein. Unless otherwise specifically noted, components depicted in the drawings are not drawn to scale. Numeric information is by example and is not intended to limit the scope of the invention unless indicated otherwise. Further, it is not intended that any of the appended claims or claim elements invoke 35 U.S.C. § 112(f) unless the words "means for" or "step for" explicitly used in the particular claim. The present disclosure should in no way be limited to the exemplary embodiment or numerical dimensions if any illustrated in the drawings and described herein.

We claim:

1. An orbital tensioner comprising:
an annular base;
a ring journalled to the annular base on a ball bearing, said ring having a cylindrical portion and a ring axis of rotation (A-A);
a first pulley journalled to the ring, a first pulley axis of rotation (B-B) offset from the ring axis of rotation (A-A);
a pivot arm pivotally mounted to the ring, a pivot arm pivot axis (C-C) offset from the ring axis of rotation (A-A), a second pulley journalled to the pivot arm;
a torsion spring biasing the pivot arm in a first direction;
the ball bearing having an inner diameter and an outer diameter, and an inner race and an outer race; wherein
the cylindrical portion of the ring has an outer diameter smaller than the inner diameter of the ball bearing so as to be fixed to the inner race; and wherein
the annular base has an inner diameter larger than the outer diameter of the ball bearing so as to fixed to the outer race; and
a damping mechanism frictionally disposed between the ring and the annular base.

2. The orbital tensioner as in claim 1, wherein the ball bearing is staked to the ring.

3. The orbital tensioner as in claim 1, wherein the ball bearing is staked to the annular base.

4. The orbital tensioner as in claim 1, wherein the damping mechanism comprises a friction member and a spring.

5. The orbital tensioner as in claim 4, wherein the spring comprises a wave spring.

6. The orbital tensioner as in claim 1, wherein the ball bearing comprises a double row bearing.

7. The orbital tensioner as in claim 1, wherein the ball bearing is a sealed bearing.

8. The orbital tensioner as in claim 1, further comprising a removable pin engaged with the pivot arm and the base.

9. An orbital tensioner comprising:
an annular base;
a ring rotationally engaged with the annular base with a ball bearing, the ring having a cylindrical portion and a ring axis of rotation (A-A);
a first pulley journalled to the ring and having a first pulley axis of rotation (B-B) that is offset from the ring axis of rotation (A-A);
a pivot arm pivotally mounted to the ring and having a pivot arm pivot axis (C-C) that is offset from the ring axis of rotation (A-A);
a second pulley journalled to the pivot arm;
a torsion spring biasing the pivot arm in a first direction;
the ball bearing having an inner diameter and an outer diameter, and an inner race and an outer race; wherein
the cylindrical portion of the ring has an outer diameter smaller than the inner diameter of the ball bearing so as to be fixed to the inner race; and wherein
the annular base has an inner diameter larger than the outer diameter of the ball bearing so as to fixed to the outer race; and
a damping mechanism frictionally disposed between the ring and the annular base.

10. The orbital tensioner as in claim 9, wherein the ball bearing is a double row bearing.

11. The orbital tensioner as in claim 10, wherein the damping mechanism comprises a wave spring and a friction element.

12. The orbital tensioner as in claim 9, wherein the ball bearing is a single row bearing.

13. The orbital tensioner as in claim 12, wherein the single row bearing is a deep groove single row bearing.

14. The orbital tensioner as in claim 9, further comprising a removable pin engaged with the pivot arm and the base.

* * * * *